(12) United States Patent
Hemsley

(10) Patent No.: US 8,610,890 B2
(45) Date of Patent: Dec. 17, 2013

(54) ARRANGEMENT AND METHOD FOR MEASURING THE DEFORMATION OF A SHAFT

(75) Inventor: Philip David Hemsley, Rugby (GB)

(73) Assignee: Alstom Technology Ltd., Baden (CH)

( * ) Notice: Subject to any disclaimer, the term of this patent is extended or adjusted under 35 U.S.C. 154(b) by 83 days.

(21) Appl. No.: 13/359,501

(22) Filed: Jan. 27, 2012

(65) Prior Publication Data

US 2012/0194825 A1    Aug. 2, 2012

(30) Foreign Application Priority Data

Feb. 1, 2011 (EP) .................................. 11152834

(51) Int. Cl.
*G01N 21/00* (2006.01)
(52) U.S. Cl.
USPC .................................................. 356/237.1
(58) Field of Classification Search
USPC ............. 356/237.1–237.5, 35.5; 235/462.25; 359/224.1
See application file for complete search history.

(56) References Cited

U.S. PATENT DOCUMENTS

| | | | |
|---|---|---|---|
| 4,347,748 A | 9/1982 | Pierson | |
| 4,507,834 A | 4/1985 | Chen et al. | |
| 4,995,257 A | 2/1991 | Leon | |
| 5,536,926 A * | 7/1996 | Ikeda et al. | 235/462.25 |
| 6,023,333 A * | 2/2000 | Laux et al. | 356/600 |
| 7,036,364 B2 * | 5/2006 | Swillo et al. | 73/159 |
| 2008/0041141 A1 | 2/2008 | Discenzo | |
| 2009/0320609 A1 | 12/2009 | Xia et al. | |
| 2011/0085889 A1 * | 4/2011 | Manfredotti et al. | 415/119 |

FOREIGN PATENT DOCUMENTS

| | | | |
|---|---|---|---|
| DE | 102009025989 A1 | | 12/2009 |
| EP | 0378781 | * | 11/1989 |
| JP | 11-344395 | * | 12/1999 |

\* cited by examiner

*Primary Examiner* — Hoa Pham
(74) *Attorney, Agent, or Firm* — Buchanan Ingersoll & Rooney PC

(57) ABSTRACT

A method for measuring deformation of a shaft by a device includes illuminating a pattern applied on the shaft before the deformation is applied; and detecting a first reference position by detecting the radiation reflected by the pattern, after the deformation is applied illuminating the pattern and detecting a second reference position by detecting the radiation reflected by the pattern. Based on the distance between the first and the second reference positions, the shaft circumferential deformation and/or torque is determined.

14 Claims, 3 Drawing Sheets

ARRANGEMENT AND METHOD FOR MEASURING THE DEFORMATION OF A SHAFT

RELATED APPLICATION

The present application hereby claims priority under 35 U.S.C. Section 119 to European Patent application number 11152834.5, filed Feb. 1, 2011, the entire contents of which are hereby incorporated by reference.

FIELD OF INVENTION

The present invention relates to an arrangement and a method for measuring the deformation of a shaft. In particular the shaft is a shaft of a gas turbine or steam turbine or electric generator.

BACKGROUND

A number of methods are known to measure the deformation of a shaft, such as the shaft of a gas turbine or steam turbine or electric generator.

U.S. Pat. No. 4,995,257 discloses a shaft with two marks longitudinally spaced apart on it; light sources and detectors for the light reflected by the marks are connected to a circuit that calculate the angular deformation.

U.S. Pat. No. 4,347,748 discloses a shaft with a first and second reflecting surfaces at spaced apart positions; light sources and detectors for the light reflected by the reflecting surfaces are provided connected to a circuit that calculates the torque.

These known systems try to directly measure the shaft deformation (i.e. directly detect the deformation angle), it is clear that since the deformation is usually very small, in some cases this measure can be inaccurate.

SUMMARY

The present disclosure is directed to an arrangement of a shaft with a device for measuring a deformation thereof. The device includes a curved pattern applied on the shaft; a radiation source for illuminating the pattern; a sensor for detecting the radiation reflected by the pattern; and a carrier movable in a predefined direction to the shaft axis over a zone facing the pattern. The carrier carries at least the sensor.

In another aspect, the disclosure is directed to a method for measuring a deformation of a shaft using a device including a curved pattern applied on the shaft; a radiation source for illuminating the pattern; a sensor for detecting the radiation reflected by the pattern; a carrier movable in a predefined direction to the shaft axis over a zone facing the pattern. The carrier carries at least the sensor; or the sensor includes a plurality of sensors that define an array that extends over a zone facing the pattern. The method includes illuminating the pattern, before deformation; detecting a first reference position by detecting the radiation reflected by the pattern; illuminating the pattern, after deformation; detecting a second reference position by detecting the radiation reflected by the pattern; and determining the shaft circumferential deformation and/or torque based on a distance between the first and the second reference positions.

BRIEF DESCRIPTION OF THE DRAWINGS

Further characteristics and advantages of the invention will be more apparent from the description of a preferred but non-exclusive embodiment of the arrangement and method, illustrated by way of non-limiting example in the accompanying drawings, in which.

DETAILED DESCRIPTION OF THE PREFERRED EMBODIMENTS

Introduction to the Embodiments

Figure 1:
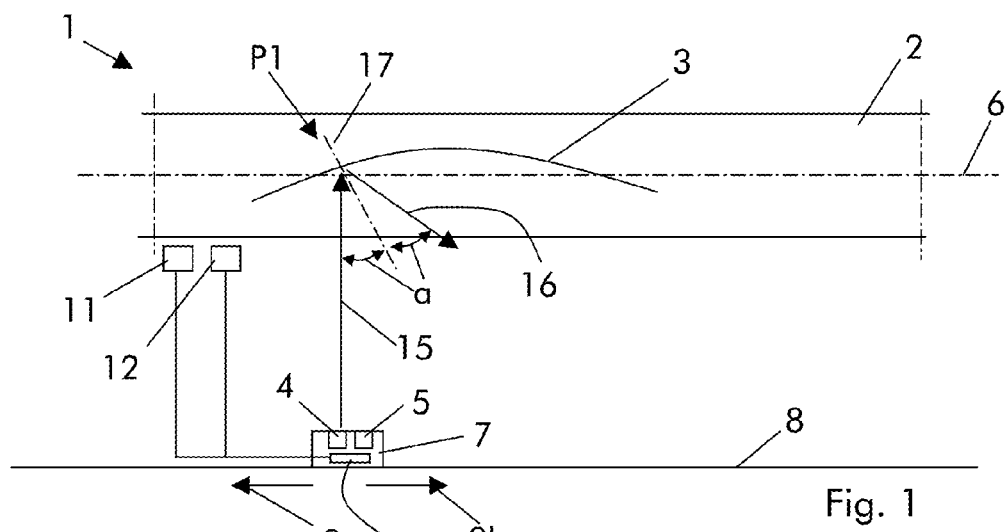
FIGS. 1 through 3 depict different steps of the method in an embodiment of the invention.
Figure 2:
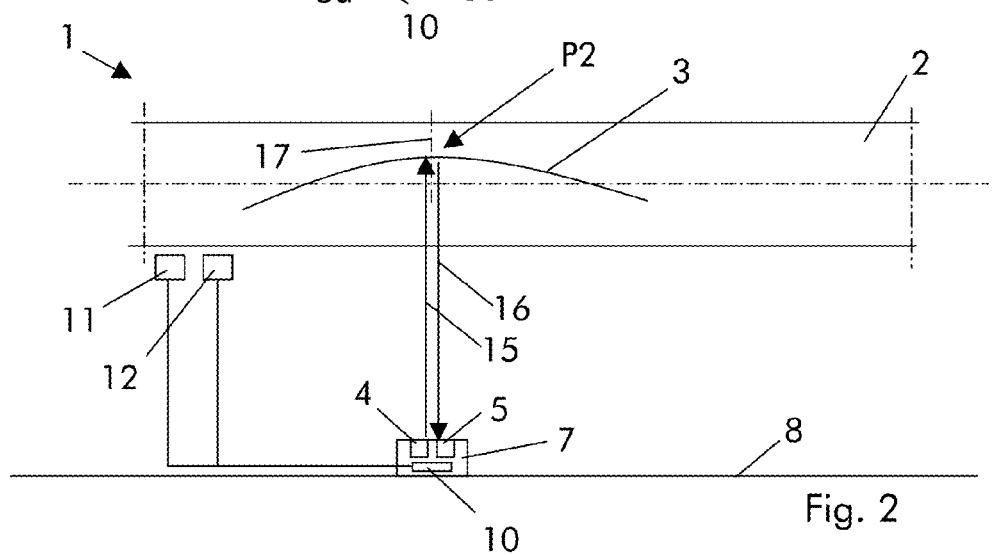

An aspect of the invention therefore includes providing an arrangement and a method by which the shaft deformation can be determined in a very accurate way.

Another aspect of the invention includes providing an arrangement and a method that are simple and reliable.

The technical aim, together with these and further aspects, are attained according to the invention by providing an arrangement and a method in accordance with the accompanying claims.

DETAILED DESCRIPTION

The arrangement 1 comprises a shaft 2 for example of a gas turbine or steam turbine or electric generator; it is anyhow clear that also a shaft of a different machine is possible. The arrangement also comprises a device for deformation measure of the shaft 2.

This device comprises a curved pattern 3 applied on the shaft 2, a radiation source 4 for illuminating the pattern 3, and a sensor 5 for detecting the radiation reflected by the pattern 3.

The curved pattern 3 can be a curved line that is applied on the shaft with different techniques; for example it can be grinded from the shaft surface, or printed on the shaft surface or it can be printed or grinded or applied with any other technique on a laminate such as a patch that is then applied on the shaft 2.

The radiation source 4 is preferably a light source and can be a directive light source or a laser, although this is not mandatory. The radiation source 4 can emit light at a particular frequency or at a given frequency range. Naturally, other kinds of radiation sources are also possible.

The sensor 5 can be a photo-diode activated by the light emitted by the radiation source 4 and reflected by the pattern 3.

Figure 3:
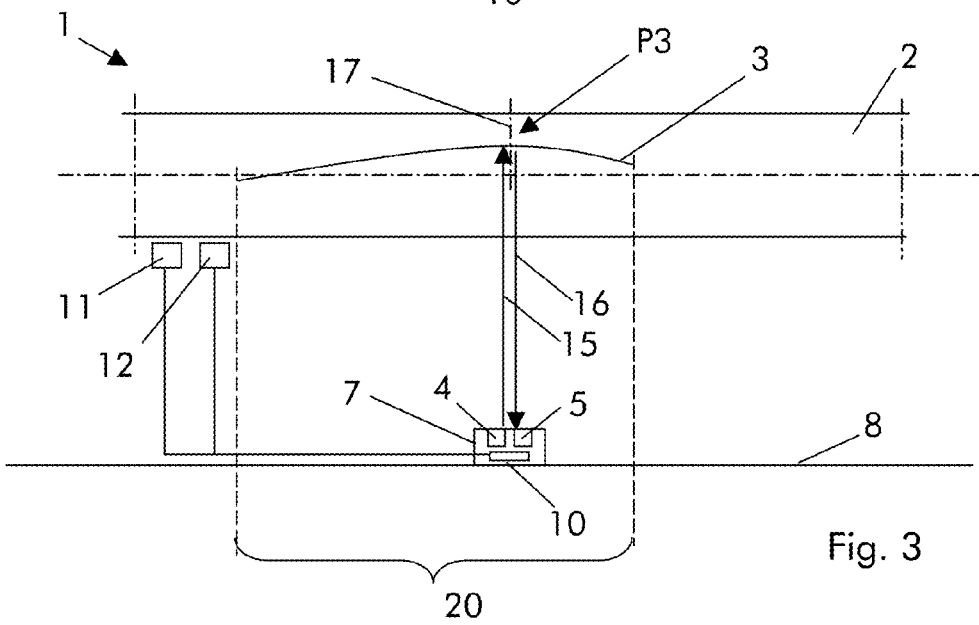
Figure 4:
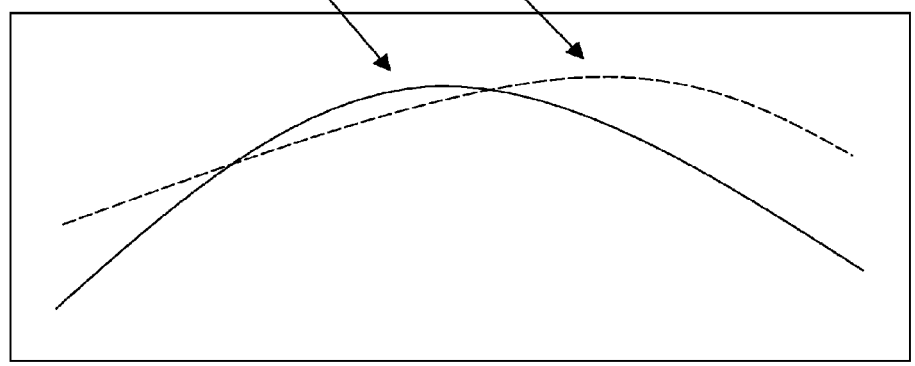
FIG. 4 shows the pattern of FIG. 2 (first step, solid line) overlapped to the pattern of FIG. 3 (second step, dashed line)
Figure 5:
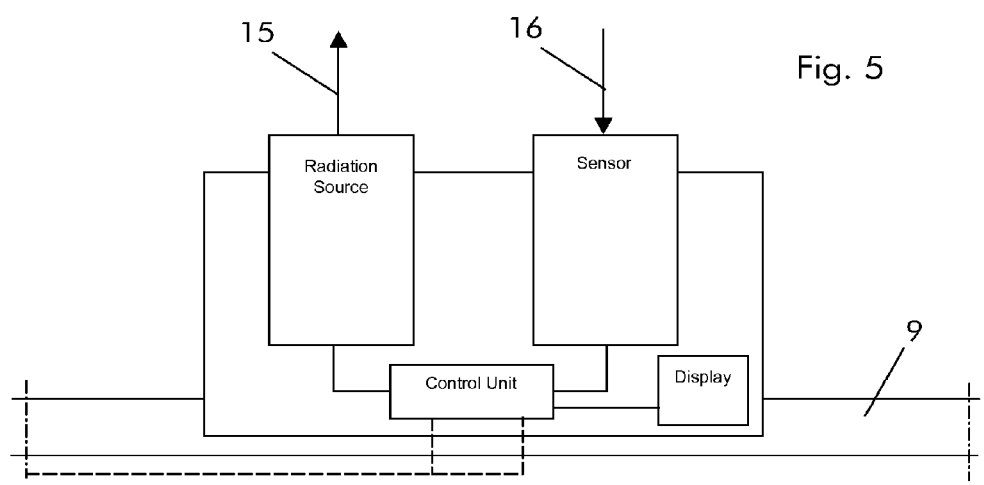
FIG. 5 shows an example of a carrier with a radiation source and sensor.

The shaft 2 has a longitudinal axis 6 and the device also comprises a carrier 7 that is movable along a predefined direction 8 with respect to the shaft axis 6 at least over a zone facing the curved pattern; for example in FIG. 3 this zone facing the curved pattern 3 over which the carrier 7 can move is identified by the reference 20.

Preferably the curved pattern 3 together with an axis parallel to the shaft axis 6 defines angles that change over the curved pattern 3.

The carrier 7 carries the sensor 5 and, in the embodiment shown, it also carries the radiation source 4.

In a preferred embodiment, the predefined direction 8 is a direction substantially parallel to the shaft axis 6 (in two opposite ways 8a, 8b).

In this respect, the device includes a rail 9 that extends parallel to the shaft axis 6 and the carrier 7 is slidable on this rail 9.

The device also includes a control unit 10 preferably aboard of the carrier 7; the control unit 10 is connected to the radiation source 4 and sensor 5 and, preferably, to an output element 21 such as a display.

In addition, the device further includes a sensor 11 of the axial position of the shaft 2; also this sensor 11 is connected to the control unit 10.

Advantageously, the control unit 10 can be arranged to activate the radiation source 4 only when the pattern 3 faces it; in this respect an angle sensor 12 is provided; it is associated to the shaft 2 and is connected to the control unit 10.

The operation of the arrangement is apparent from what described and illustrated and is substantially the following.

FIG. 1 shows a first operating step in which a first reference position of the carrier 7 is measured. For example it can be measured with a non operating shaft (i.e. it is at rest) or with a shaft rotating under given conditions.

The carrier 7 is moved along the direction 8 and the radiation source 4 is activated.

When the shaft rotates, the radiation source 4 is preferably activated only when the pattern 3 faces it; this is achieved by measuring the angle position of the shaft 2 via the sensor 11 and transmitting this information to the control unit 10 that activates the radiation source 4 accordingly.

The light beam 15 generated by the radiation source 4 hits the shaft 2 and pattern 3 with an angle a and is reflected back (reference 16 indicates the reflected beam) with the same angle a with respect to an axis 17 perpendicular to the pattern 3 at the position where the beam hits it.

As shown in FIG. 1, if at a position P1 the pattern 3 is not substantially perpendicular to the beam 15, the reflected beam 16 is not reflected towards the carrier 7 and sensor 5 and the sensor 5 does not detect any signal.

When the carrier 7 is moved and the beam 15 hits the pattern 3 at a position P2 where the pattern 3 and the beam 15 are substantially perpendicular to one another, the reflected beam 16 is reflected substantially parallel to the beam 15 towards the sensor 5; thus the reflected beam 16 can be detected by the sensor 5 and a first reference position of the sensor 5 (or carrier 7) is ascertained.

Thus, torque is applied and the shaft undergoes a deformation that must be determined.

This deformation causes the pattern 3 to be deformed, for example FIG. 1 shows the pattern 3 that has been deformed because of the shaft deformation; it is clear that after this deformation the sensor 5 at the first reference position no longer receives the reflected beam 16.

Thus, with the same steps already described to detect the first reference position, a position P3 where the deformed pattern 3 is substantially perpendicular to the beam 15 is determined and a second reference position of the sensor 5 (or carrier 7) is ascertained.

The axial distance (i.e. the distance between the first and second reference positions along the shaft axis 6) is indicative of the shaft deformation.

In this respect the pattern 3 can have a shape such that a given deformation of the shaft (torque) corresponds to a given distance between the first and second reference position; this advantageously allows also limited deformations to be very precisely determined, because this indirect detection allows the shaft deformation to be amplified for easy of detection.

During operation, the shaft 2 could also withstand an axial shifting; for this reason the axial position of the shaft 2 is measured to detect its possible shifting; this information is then transmitted to the control unit 10, in order to compensate for the value of the distance difference between the first and second reference positions and, in other words, to compensate for the shaft deformation.

Figure 6:
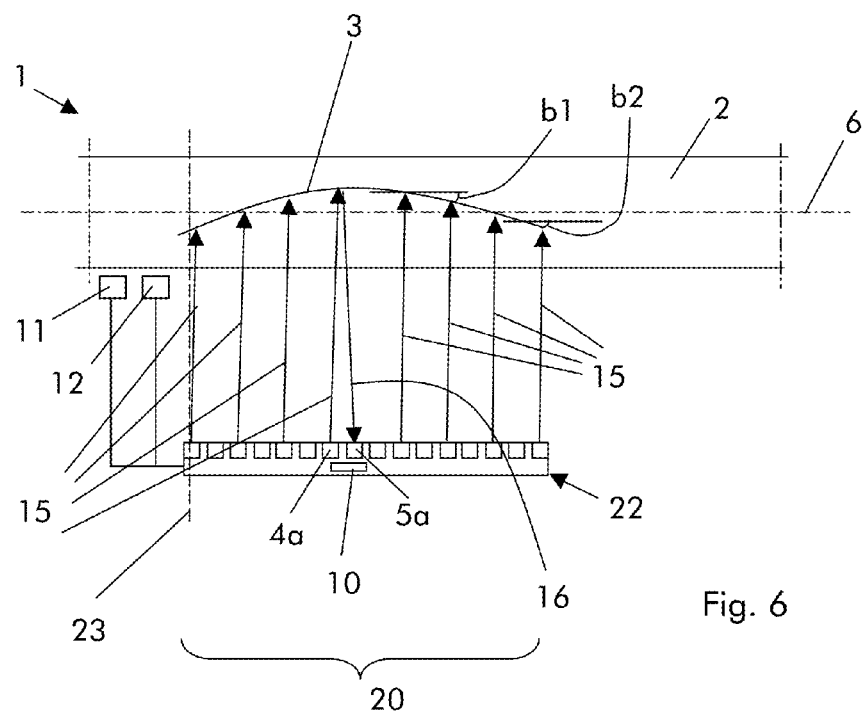
FIG. 6 shows a different embodiment of the arrangement.

FIG. 6 shows a different embodiment of the arrangement. In this figure like references indicate the same or similar elements to those already described.

As shown also the arrangement in this embodiment includes the shaft 2 with the curved pattern 3 that, for example, has the same features of the pattern already described with reference to the previous embodiment.

In addition, instead of a radiation source 4 and sensor 5 mounted on a carrier 7 that can move over a zone 20 facing the curved pattern 3, an array 22 comprising a plurality of radiation sources 4 and sensors 5 is provided.

Preferably radiation sources 4 and sensors 5 are arranged in couples, i.e. a radiation source 4 has a corresponding sensor 5.

In addition, preferably the array 22 extends over the zone 20 facing the curved pattern 3.

All the radiation sources 4 and sensors 5 (they can have the same features already described for the first embodiment) are connected to the control unit 10; the control unit 10 is in turn connected to the sensor 11 of the axial position of the shaft 2 and sensor 12 of the angle.

Preferably the curved pattern 3 together with an axis parallel to the shaft axis 6 defines angles b1, b2 that change over the curved pattern 3.

This arrangement has the advantage of no moving parts.

The operation of the arrangement in this embodiment is similar to the one already described.

Before the torque to be measured (or the deformation caused by it) is applied, the radiation sources 4 (all of them) are activated; they generate beams 15 that are reflected by the pattern 3; in particular, as already described, only where the pattern 3 is substantially perpendicular to the beam 15 the reflected beam 16 hits a sensor 5.

In particular, the beams 15 are emitted at a very small angle to an axis 23 perpendicular to the shaft axis 6; for this reason if a beam 15 is emitted by a radiation source 4a, the corresponding beam 16 reflected by the pattern 3 at a position substantially perpendicular to the beam 15 hits the sensor 5a adjacent to it and shifted in the direction of the inclination of the beam 15. In this way a first reference position can be ascertained.

Afterwards, the torque to be measured is applied, the measure is carried out again and a second reference position is ascertained.

The distance (or difference) between the first and second reference positions allows the torque and/or the circular deformation to be ascertained.

Figure 7:
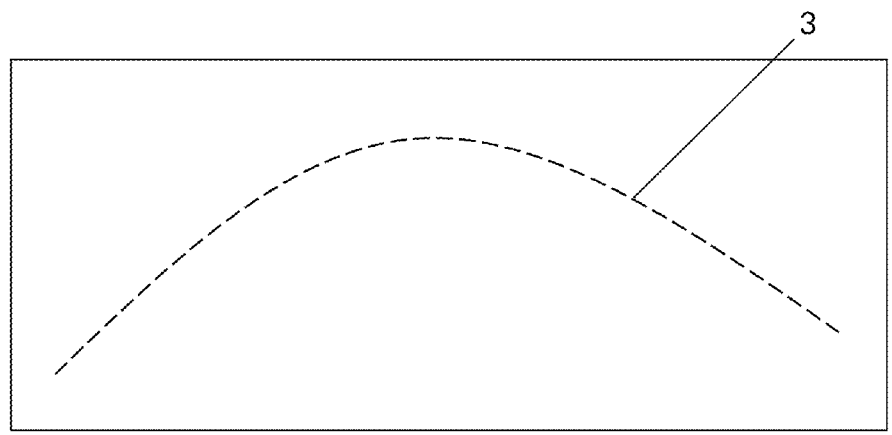
FIG. 7 shows a particular embodiment of a curved pattern.

In a different embodiment (FIG. 7), the curved pattern 3 could also be made of a number of discrete angled lines, to have a digital rather than a continuous analog measure.

The present invention also refers to a method for measuring the deformation of a shaft.

The method comprises, before the deformation is applied, illuminating the pattern 3, and detecting a first reference position by detecting the radiation reflected by the pattern 3.

Therefore, the deformation is applied and the further steps of illuminating the pattern and detecting a second reference position by detecting the radiation reflected by the pattern 3 are carried out.

Therefore, on the basis of the distance between the first and the second reference positions, the shaft circumferential deformation and/or torque can be determined.

Advantageously, the distance between the first and the second reference positions is ascertained along a direction parallel to the shaft axis.

Naturally the features described may be independently provided from one another.

In practice, the materials used and the dimensions can be chosen at will according to requirements and to the state of the art.

REFERENCE NUMBERS 1 arrangement
2 shaft
3 pattern
4, 4a radiation source
5, 5a sensor
6 axis of 2
7 carrier
8 direction
8a, 8b ways of 8
9 rail
10 control unit
11 sensor of the axial position of 2
12 sensor of the angle of 2
15 light beam generated by 4
16 light beam reflected by 3
17 axis perpendicular to 3
20 zone facing the pattern
21 display
22 array
23 axis perpendicular to 6
a angle
P1, P2, P3 positions on 3

What is claimed is:

1. Arrangement of a shaft with a device for measuring a deformation thereof, the device comprising:
   a curved pattern applied on the shaft;
   a radiation source for illuminating the pattern,
   a sensor for detecting the radiation reflected by the pattern, and
   a carrier movable in a predefined direction to the shaft axis over a zone facing the pattern, wherein the carrier carries at least the sensor.

2. The arrangement according to claim 1, wherein the carrier also carries the radiation source.

3. The arrangement according to claim 1, wherein the predefined direction is a direction substantially parallel to the shaft axis.

4. The arrangement according to claim 1, wherein the curved pattern together with an axis parallel to the shaft axis defines angles that change over the curved pattern.

5. The arrangement according to claim 1, further comprising a sensor, which senses an axial position of the shaft.

6. The arrangement according to claim 1, further comprising a control unit, which activates the radiation source only when the pattern faces the radiation source.

7. The arrangement according to claim 6, further comprising an angle sensor associated with the shaft and connected to the control unit.

8. The arrangement according to claim 1, wherein the radiation source is a light source.

9. The arrangement according to claim 8, wherein the light source is a laser.

10. The arrangement according to claim 1, wherein the pattern comprises a plurality of discrete angled lines.

11. Method for measuring a deformation of a shaft using a device comprising:
    a curved pattern applied on the shaft;
    a radiation source for illuminating the pattern,
    a sensor for detecting the radiation reflected by the pattern,
    a carrier movable in a predefined direction to the shaft axis over a zone facing the pattern, wherein the carrier carries at least the sensor; or the sensor includes a plurality of sensors that define an array that extends over a zone facing the pattern, the method comprising:
    illuminating the pattern, before deformation;
    detecting a first reference position by detecting the radiation reflected by the pattern;
    illuminating the pattern, after deformation;
    detecting a second reference position by detecting the radiation reflected by the pattern; and
    determining the shaft circumferential deformation and/or torque based on a distance between the first and the second reference positions.

12. The method according to claim 11, wherein the carrier also carries the radiation source.

13. The method according to claim 11, wherein the distance between the first and the second reference positions is ascertained along a direction parallel to a shaft axis.

14. The method according to claim 11, wherein the array also comprises a plurality of radiation sources.

* * * * *